United States Patent [19]
Cotton et al.

[11] Patent Number: 5,730,394
[45] Date of Patent: Mar. 24, 1998

[54] VERTICAL PERFORMANCE LIMIT COMPENSATOR

[75] Inventors: Bryan S. Cotton, Monroe; Don L. Adams, Sr., Fairfield, both of Conn.

[73] Assignee: Sikorsky Aircraft Corporation, Stratford, Conn.

[21] Appl. No.: 575,452

[22] Filed: Dec. 20, 1995

[51] Int. Cl.[6] ............... B64C 27/20; B64D 31/06
[52] U.S. Cl. ............... 244/180; 244/190; 244/195; 701/2; 701/5; 701/8; 701/11
[58] Field of Search ............... 244/76 R, 175, 244/180, 189, 190, 193, 194, 195; 364/433; 701/2, 3, 4, 5, 8, 11

[56] References Cited

U.S. PATENT DOCUMENTS

| | | | |
|---|---|---|---|
| 2,844,338 | 7/1958 | Keith | 244/193 |
| 4,071,811 | 1/1978 | Irwin | 244/189 X |
| 4,564,908 | 1/1986 | Clelford et al. | 244/180 X |
| 4,628,455 | 12/1986 | Skutecki | |
| 4,980,835 | 12/1990 | Lawrence et al. | |
| 5,265,825 | 11/1993 | Ebert et al. | 244/195 X |
| 5,314,147 | 5/1994 | Ebert et al. | 244/195 X |
| 5,339,244 | 8/1994 | Stiles, Jr. et al. | |
| 5,429,089 | 7/1995 | Thornberg et al. | |

*Primary Examiner*—William Grant

[57] ABSTRACT

A vertical performance limit compensator is provided for a rotary wing aircraft. The compensator modifies a vertical velocity command signal for the aircraft's autopilot. The vertical velocity command signal represents a desired vertical velocity for the aircraft, and results in an associated engine power demand. Existing engine power remaining beyond that required for level flight is excess engine power. An engine performance signal is provided as an indication of an engine power demand that exceeds the excess engine power. A compensated vertical velocity command signal having a magnitude lower than the vertical velocity command signal is provided in response to the vertical velocity command signal and the presence of the engine performance signal.

22 Claims, 5 Drawing Sheets

VERTICAL PERFORMANCE LIMIT COMPENSATOR

TECHNICAL FIELD

This invention relates to rotary wing aircraft and more particularly to rotary wing aircraft having means for automatically limiting collective to maintain engine rpm when engine output power capability is exceeded.

BACKGROUND ART

As known in the art, when rotary wing aircraft are commanded to climb at a vertical velocity which demands more than the excess engine power, the engine RPM drops off (droop) and the aircraft loses altitude unless the commanded climb rate is reduced. The excess engine power is the amount of power produced by the engine which exceeds that required for level flight, in contrast to the available engine power which is the total power produced by the aircraft engine. Since the excess engine power at any given time is a function of such factors as payload and air density (altitude), a fixed limit on the commanded climb rate is undesirable since it does not provide both maximum utilization of excess power and protection against RPM drop off, droop. Prior art systems rely on pilot intervention to lower the collective pitch of the rotor, i.e. the pitch angle that is equally applied to all of the rotor blades to vary the lift and consequently vertical velocity, to regain engine rpm whenever the commanded climb rate demands more than the excess power.

DISCLOSURE OF INVENTION

An object of the present invention is to provide a vertical performance limit compensator for use in a rotary winged aircraft which will automatically limit the commanded collective when the commanded collective demands more than the excess engine output power.

According to the present invention, a vertical performance limit compensator includes sensor means for providing an engine performance signal indicative, of the presence of a power demand exceeding the excess engine power, and further includes compensation means for providing, in the joint presence of the engine performance signal and a vertical velocity command signal a compensated vertical velocity command signal having a lower magnitude than that of the vertical velocity command signal.

In further accord with the present invention, a vertical performance limit compensator includes an engine performance signal that comprises an engine RPM error signal, and further includes a means for providing, in the joint presence of the engine RPM error signal and a vertical velocity command signal a compensated vertical velocity command signal at a magnitude which is reduced from that of the vertical velocity command signal, by an amount proportionate to the magnitude of the engine RPM error signal.

The vertical performance limit compensator of the present invention reduces the commanded collective as a function of the difference between the actual engine RPM and the commanded engine RPM so as to automatically allow maximum utilization of excess engine power without the risk of losing the aircraft due to engine RPM droop, whenever the power demanded by the commanded climb rate exceeds the excess engine output power.

These and other objects, features, and advantages of the present invention will become more apparent in light of the following detailed description of a best mode embodiment thereof, as illustrated in the accompanying drawings.

BEST MODE FOR CARRYING OUT THE INVENTION

Figure 1:
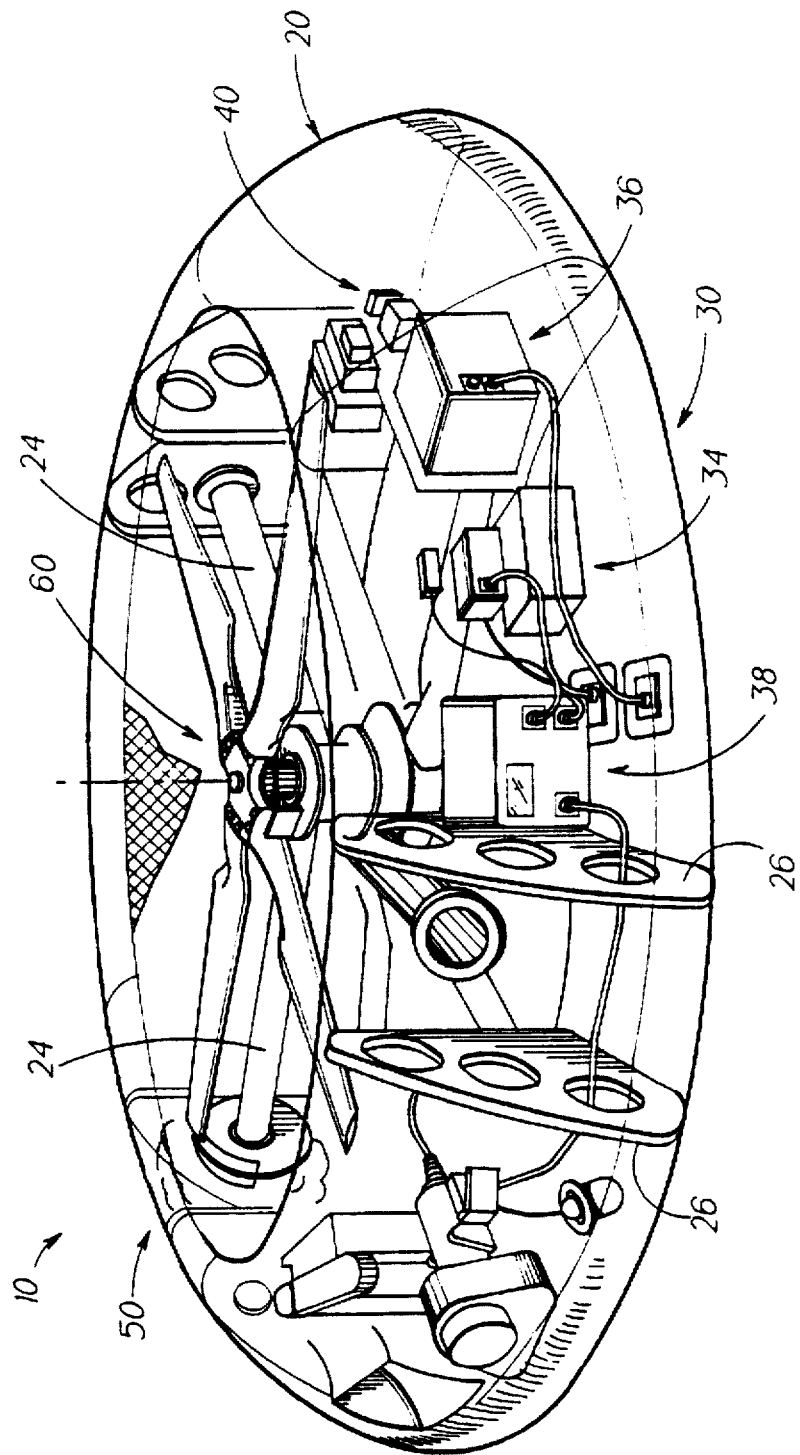
FIG. 1 is a perspective view, partially cut away, of an unmanned aerial vehicle (UAV) in which the vertical performance limit compensator of the present invention may be used.

The vertical performance limit compensator of the present invention is disclosed with respect to a best mode embodiment for use in an unmanned aerial vehicle (UAV), of the type illustrated in FIG. 1.

Referring to FIG. 1, a UAV 10 of the type disclosed in U.S. Pat. No. 5,351,913 includes a toroidal-like fuselage 20 which houses, in internal bays 26, the craft's flight/mission equipment 30, power plant subsystem 50, and rotor assembly 60. The fuselage 20 includes structural supports 24 which support the rotor assembly 60 in fixed coaxial relation to the fuselage. The flight/mission equipment 30 includes avionics 34, navigation equipment 36, flight computer 38, and communications equipment 40 (for relaying real time sensor data and receiving real time command input signals).

Figure 2:
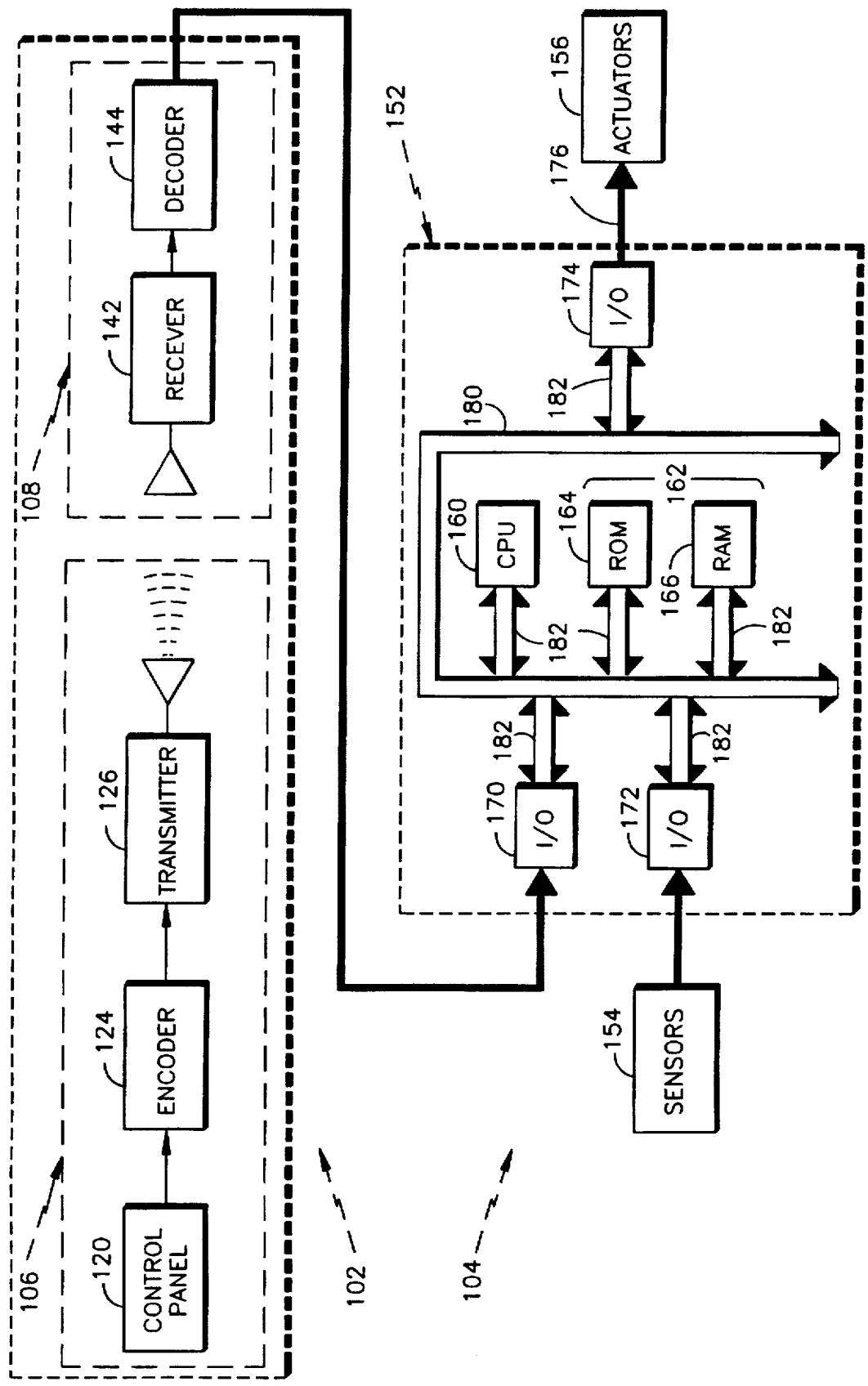
FIG. 2 is a system block diagram of a flight control system of the type used in the UAV of FIG. 1, and which incorporate the vertical performance limit compensator of the present invention.

Referring now to FIG. 2, UAV maneuvers are directed, communicated, and implemented by means of uplink and flight control systems, 102 and 104 respectively. The uplink system comprises a ground based portion 106 which is responsive to operator command, and a flight portion 108 which is located in the UAV communication equipment 40 (FIG. 1). The ground portion 106 includes a control panel 120, an encoder 124, and a transmitter 126.

The control panel 120 has a plurality of control mechanisms (not shown) to direct UAV maneuvers. The encoder 124 converts the command signals from the panel 120 to pulse code modulation (PCM) format for transmission by the transmitter 126 to the UAV. The ground transmitted information is received by a receiver 142 within the flight portion 108 and is converted from the PCM format to the command signal format by a decoder 144. The decoded command signals are then presented to the flight control computer The flight control computer 152 is a component of the flight control system 104, which also includes a plurality of sensors 154 which provide sensed parameter signals to the flight control computer, and a plurality of actuators 156 to control the rotor and throttle under the direction of the flight control computer.

The flight control computer 152 is comprised of a central processing unit 160, a memory section 162 having a read only memory (ROM) portion 164 and a random access memory (RAM) portion 166, an input section 170 for receiving commands from the uplink 102, an input section 172 for receiving signals from the plurality of sensors 154, an output section 174 that sends signals over a plurality of lines 176 to direct the plurality of actuators 156, and a processor bus 180 with interconnections 182 to the elements of the flight control computer 152.

A flight control program stored in the memory section 162 directs the flight control computer 152 to process the input transmitted ground commands signals and, with the aid of the rest of the flight control system 104, initiates the appropriate actions to carry out the commanded maneuvers.

Alternatively, the flight computer may also execute commanded maneuvers stored in the memory section 162. For example, the flight control computer is programmed to monitor the operational status of the uplink 102, and in the event that the uplink 102 becomes inoperable, the flight control computer executes a set of commands stored in the memory section 162 that are designed to maneuver the UAV back to a predetermined location.

Figure 3:
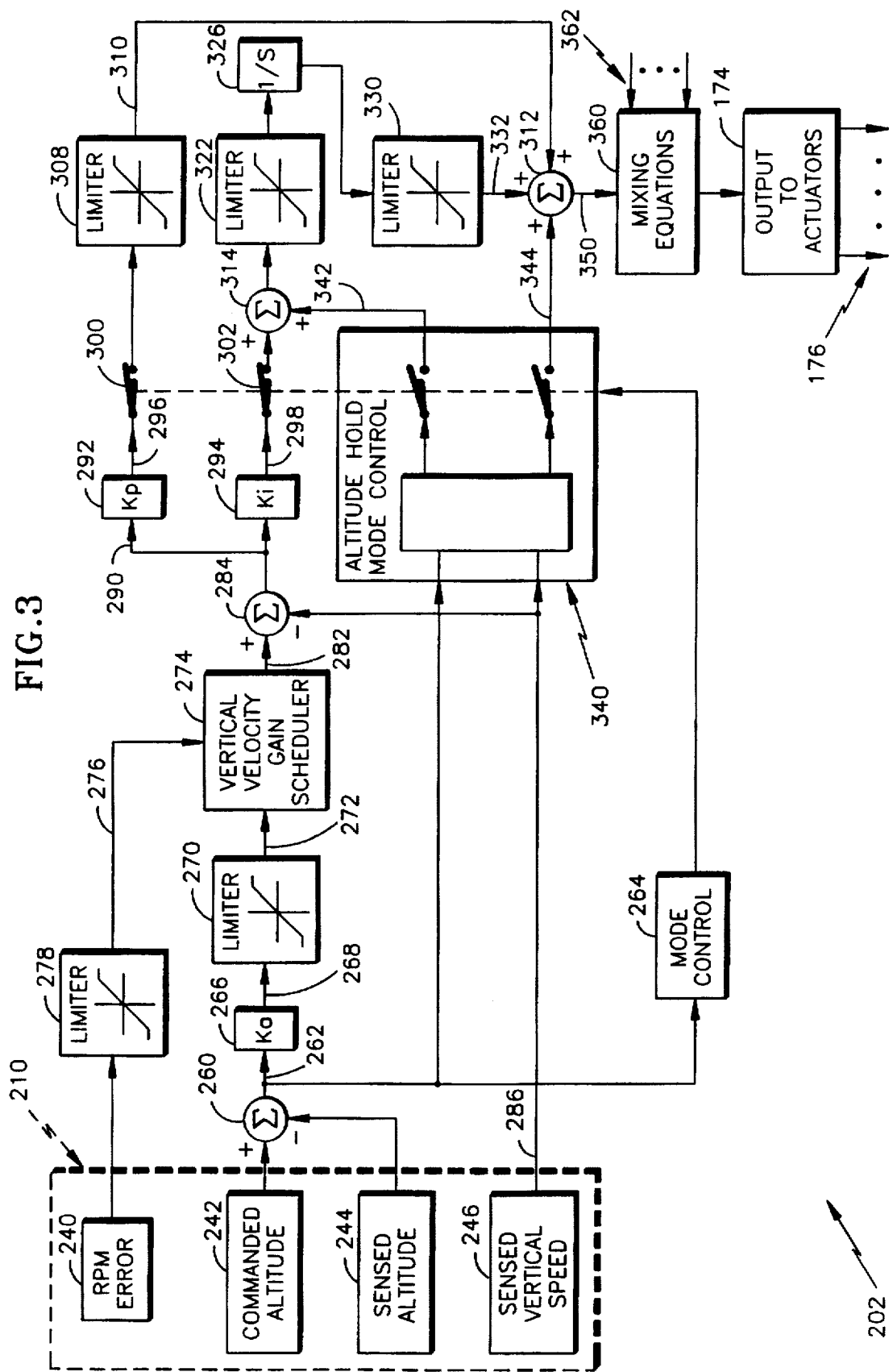
FIG. 3 is a functional block diagram of the vertical performance limit compensator of the present invention.

Referring now to FIG. 3, a portion 202 of a collective autopilot program, hereinafter collective autopilot program, within the UAV's flight control program, receives input signals 210, including an RPM error signal 240, a commanded altitude signal 242, a sensed altitude signal 244, and a sensed vertical velocity signal 246. The RPM error signal 240 is an output of a throttle portion of the flight control system 104, and is the difference between the commanded engine RPM and the actual engine RPM. In the present embodiment, the RPM error signal represents the commanded engine RPM subtracted from the actual engine RPM so that negative RPM errors indicate actual less than commanded, i.e. RPM droop. The commanded altitude signal 242 is derived from a ground altitude command sent over the uplink 102 to the flight control computer 152 or from the memory 162 if the flight control computer is executing commands stored in memory. The sensed altitude signal 244 is received from a UAV altimeter (not shown) and the sensed vertical velocity signal 246 is received from the navigation equipment 36 (FIG. 1).

In operation, the collective autopilot program 202 subtracts the sensed altitude signal 244 from the commanded altitude signal 242 at an altitude summing junction 260 to produce an altitude error signal on line 262. The altitude error signal represents the difference between the UAV's sensed altitude and the commanded altitude. The altitude error signal is the input to a mode control block 264 that determines which of the collective autopilot program's operating modes, vertical velocity mode or altitude hold mode, is in effect.

The vertical velocity mode corrects an altitude error by commanding and controlling on vertical velocity. It is faster and more appropriate for larger altitude errors, which are generally the result of a new altitude command. Altitude hold mode corrects an altitude error by commanding and controlling on altitude directly. Altitude hold mode is smoother and more appropriate for smaller altitude errors, which are generally the result of atmospheric disturbances rather than new altitude commands.

The mode control block 264 selects the most appropriate mode to correct for a specific altitude error. The mode control block 264 switches from altitude hold mode to vertical velocity mode whenever the altitude error represented by the altitude error signal on line 262 exceeds a threshold substantially in the range of from 10 to 20 feet.

When the altitude error is sufficiently reduced, the mode control block 264 switches back to altitude hold mode.

In the present embodiment, no hysteresis is employed and the threshold for switching back to altitude hold mode is also substantially in the range of from 10 to 20 feet. However, if hysteresis is desired, the threshold for switching back to altitude hold mode could be set below 10 feet, such as 1 foot. The mode control block 264 remains in altitude hold mode until the altitude error again exceeds the threshold for switching to vertical velocity mode.

As an alternative to the vertical velocity/altitude hold mode system described above, a purely altitude hold mode system is also possible although it might have more overshoot than the present system. Furthermore, a purely vertical velocity mode is also possible if a higher fidelity vertical velocity mode signal were available, e.g. less noise, etc.

The altitude error signal on line 262 is also sent to a gain stage 266 that produces a vertical velocity command signal on line 268 for use in the vertical velocity mode of the collective autopilot program 202. Since the vertical velocity command, which is proportional to the altitude error signal on line 202, may exceed the preferred vertical velocity range of the UAV 10, approximately +/−500 feet per minute (ft/min), it is passed through a limiter 270 to produce a limited vertical velocity command on line 272. It should be noted that the sign convention in the UAV 10, which is arbitrary although consistent throughout the flight control system, is positive velocity for downward velocity and negative velocity for upward velocity.

The limited vertical velocity command on line 272 may still demand more than the excess power of the UAV, which varies with payload and density altitude. The present vertical performance limit compensator limits the command whenever the demanded power exceeds the excess power with a vertical velocity gain scheduler 274. The gain scheduler 274 receives the limited vertical velocity command signal on line 272 and an engine RPM error signal on line 276 from the RPM error signal 240 through a limiter 278. Limiter 278 may have a filter or lag network incorporated into it to reduce noise and prevent unstable interaction between the RPM error signal 240 and the vertical velocity gain scheduler 274. Limiter 278 is included as a matter of design practice but may not be necessary and/or may be integrated into transfer characteristics of the vertical velocity gain scheduler 274.

Depending on the magnitude of the engine RPM error signal, the vertical velocity gain scheduler 274 applies a gain between zero and unity to the limited velocity command on line 276. If there is no drop off in RPM, then the gain applied is unity. If a drop off in RPM exceeds a designated threshold, then the gain applied is less than unity but no less than zero.

The output of the vertical velocity gain scheduler 274 is a performance compensated vertical velocity command signal on line 282 which, together with a sensed vertical velocity signal on line 286, is presented to summing junction 284 which provides, as the difference sum of the two, a vertical velocity error on line 290. The vertical velocity error can be driven to "zero", so long as the performance compensated vertical velocity command can be achieved by the UAV. This can be referred to as vertical performance limit compensation in a closed loop.

The vertical velocity error is presented simultaneously to a proportional path gain stage 292 and an integral path gain stage 294. The gains of the stages 292, 294 are selected to meet stability and overall control system performance requirements, and the outputs are presented through lines 296, 298 to switches, 300 and 302 respectively. The switches are shown illustratively as single pole-single throw configurations with their open/closed state controlled by the mode control block 264. The switches are both closed for vertical velocity mode and both opened for altitude hold mode. In reality the switches do not transition from open to closed state in discrete steps, but fade in and out in a gradual manner.

The output of the switch 300 is passed through a limiter 308 such that the magnitude of a limited vertical velocity mode proportionate path signal on line 310 will not saturate a collective command summing junction 312. The output of switch 302 is passed to an integral path summing junction 314 together with a signal from the altitude hold mode path, and the sum is sent through a limiter 322, so that the steady state collective is not changed too rapidly, to an integrator 326. The rate limit can be varied depending upon the autopilot mode of operation, i.e. autopilot takeoff mode v. other modes. The output of the integrator through a limiter 326 is passed through a limiter which maintains the limited integral path signal magnitude on line 332 in the range of between 0% collective and 100% collective. In the present embodiment, the limiter 330 is implemented within the integrator 326 stage. The limited integral path signal is input to the collective command summing junction 312.

The altitude error signal on line 262 is also sent to an altitude hold mode control block 340 which includes internal switches (not shown) that are under the control of the mode control block 264 and which are similar to switches 300, 302 with the exception that they are closed for altitude hold mode and opened for vertical velocity mode.

The altitude hold mode control block 340 has an integral path output on line 342 and a proportional path output on line 344. The integral path output goes to integral path summing junction 314, described above, and the proportional path output goes to the collective command summing junction 312. The collective command summing junction 312 sends a collective command signal on line 350 to a set of mixing equations 360, which also receives signals 362 from other axis autopilot programs, i.e. cyclic pitch, not shown, in the flight control program. This produces a set of output signals that are presented by the output section 174, through lines 176, to the UAV actuators 156 (FIG. 2).

The UAV flight control program has autopilot and manual modes. The collective autopilot program, described above, is active when the flight control program is in autopilot mode for the collective axis, otherwise, it is overridden by opening the connection between the collective command on the line 350 and the set of mixing equations 360, and making a connection between a manual collective command from the uplink 102 and the set of mixing equations 360. Changing modes also requires that various values be properly initialized. The tasks associated with changing between autopilot and manual modes are performed by another portion, not shown, of the flight control program.

It should be understood that while FIG. 3 provides a functional block diagram illustration for teaching of the invention, the best mode of the present invention is in software.

Figure 4:
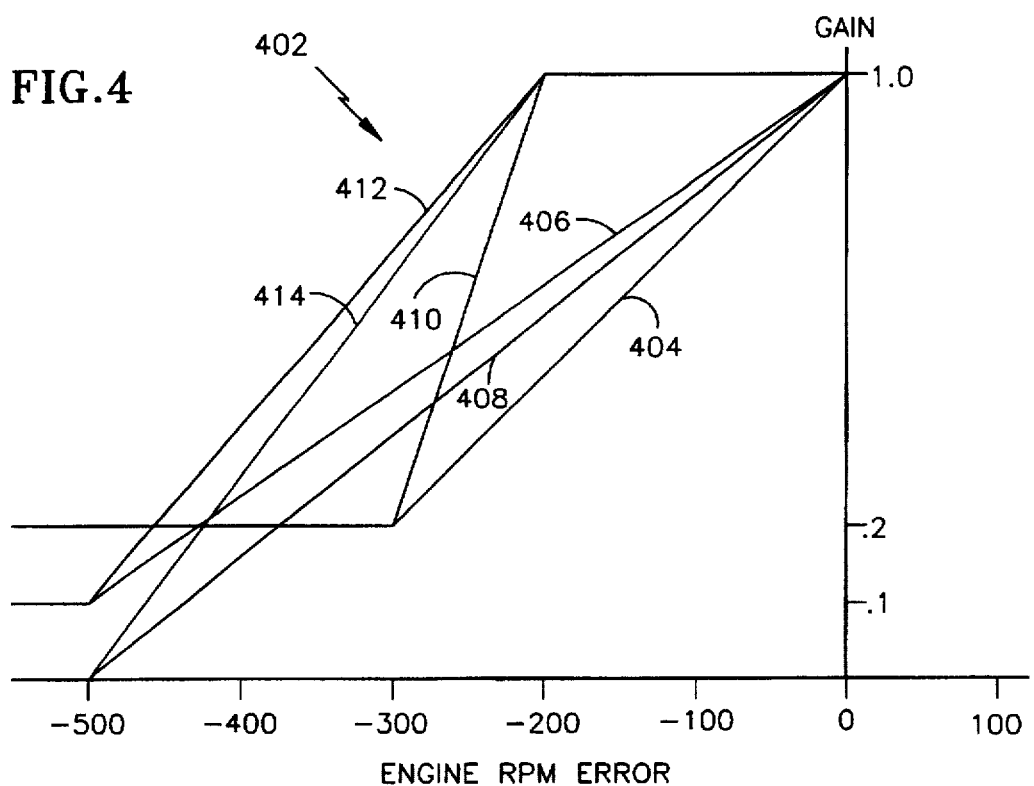
FIG. 4 is a diagrammatic illustration used in the teaching of the transfer characteristics of one element of the compensator embodiment of FIG. 3.

Referring now to FIG. 4, a set of curves 402 illustrate the transfer characteristics for the vertical velocity gain scheduler 274 of the vertical performance limit compensator described in FIG. 3. As described above, negative engine RPM errors refer to actual engine RPM less than commanded engine RPM, i.e. droop. As the curves 402 show, for zero and positive RPM errors, i.e. no droop, the gain is unity, no attenuation. For negative engine RPM errors, a reduction in the gain begins at a threshold that is substantially in the range of from below 0 RPM to −200 RPM. This range results from the observation that the UAV 10 performance at −200 RPM error, engine speed 6800 RPM, is very nearly as good as the performance at the desired engine speed of 7000 RPM. The threshold for a group of curves 404, 406, and 408 is below 0 RPM, while another group of curves 410, 412, 414 has this threshold at −200 RPM.

For engine RPM errors that are more negative than the threshold, e.g. where the amount of droop exceeds the threshold, the gain falls off linearly until a minimum gain is reached. The minimum gain for the curves 402 is in the range of from 0.2 to zero, where 0.2 is selected as the upper end of the minimum gain range in order to reduce the power demand as much as is practical so that further droop is minimized. Given the conditions at which minimum gain is applied, there is no need for more than 100 ft/min vertical velocity capability. Dividing 100 ft/min by the maximum limited vertical velocity command on the line 272 of 500 ft/min, produces a gain of 0.2 ft/min per ft/min.

The minimum negative engine RPM error, i.e. minimum droop, for which the minimum gain is applied is in the range of from −300 RPM to −500 RPM. The −500 RPM error is the extreme because it generally represents the minimum engine RPM at which the UAV has suitable thrust and control for normal operation. The −300 RPM boundary is chosen because the operation of the UAV 10 with an RPM droop of less than −300 RPM is not degraded to a degree that requires the gain to be at the minimum.

For curves 404 and 410, the minimum gain is 0.2 and the minimum engine RPM error for that minimum gain is −300 RPM. For the curves 406 and 412, the minimum gain is 0.1 and the minimum engine RPM error for that minimum gain is −500 RPM. For the curves 408 and 414, the minimum gain is zero and the minimum engine RPM error for that minimum gain is −500 RPM.

Figure 5:
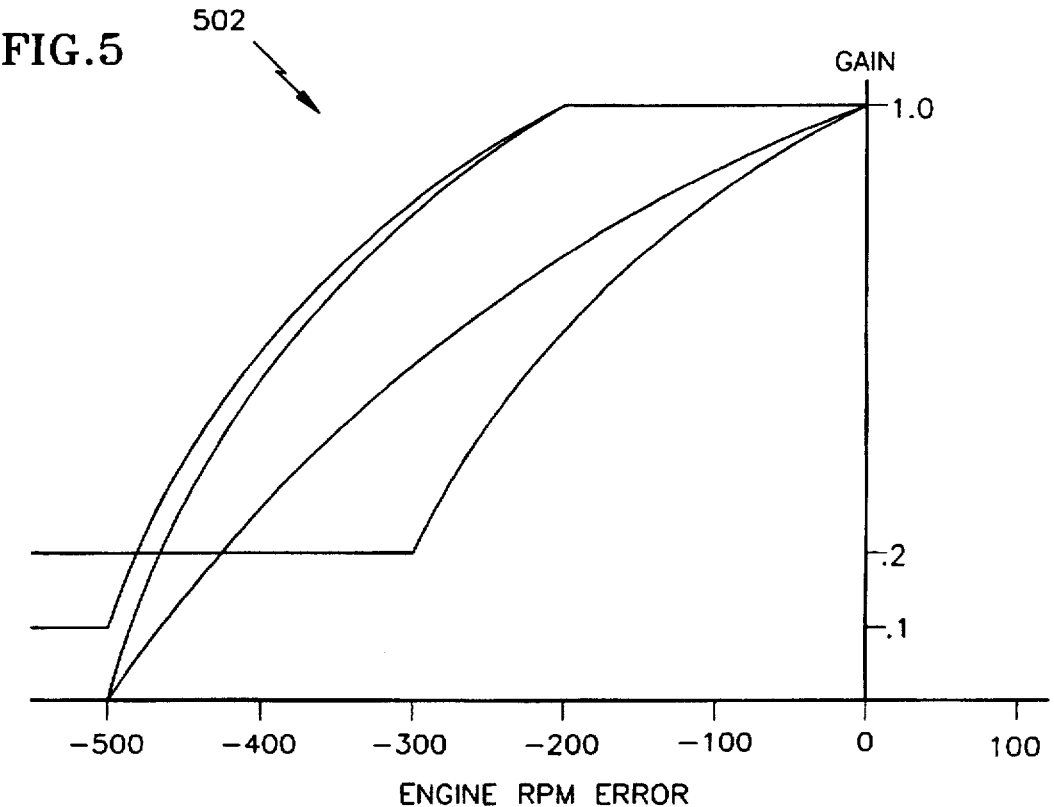
FIG. 5 is another illustration used in the teaching of alternative transfer characteristics to those illustrated in FIG. 4.

Referring now to FIG. 5, curves 502 illustrate alternative transfer characteristics for the vertical velocity gain scheduler 274. As these curves 502 illustrate, the gain functions need not be linear or piecewise linear. Where the gain is not constant, the slope of the curve preferably increases as the amount of droop increases. It should be recognized that other suitable curves as well as suitable combinations of the curves in FIG. 4 and FIG. 5 may also be used.

Figure 6:
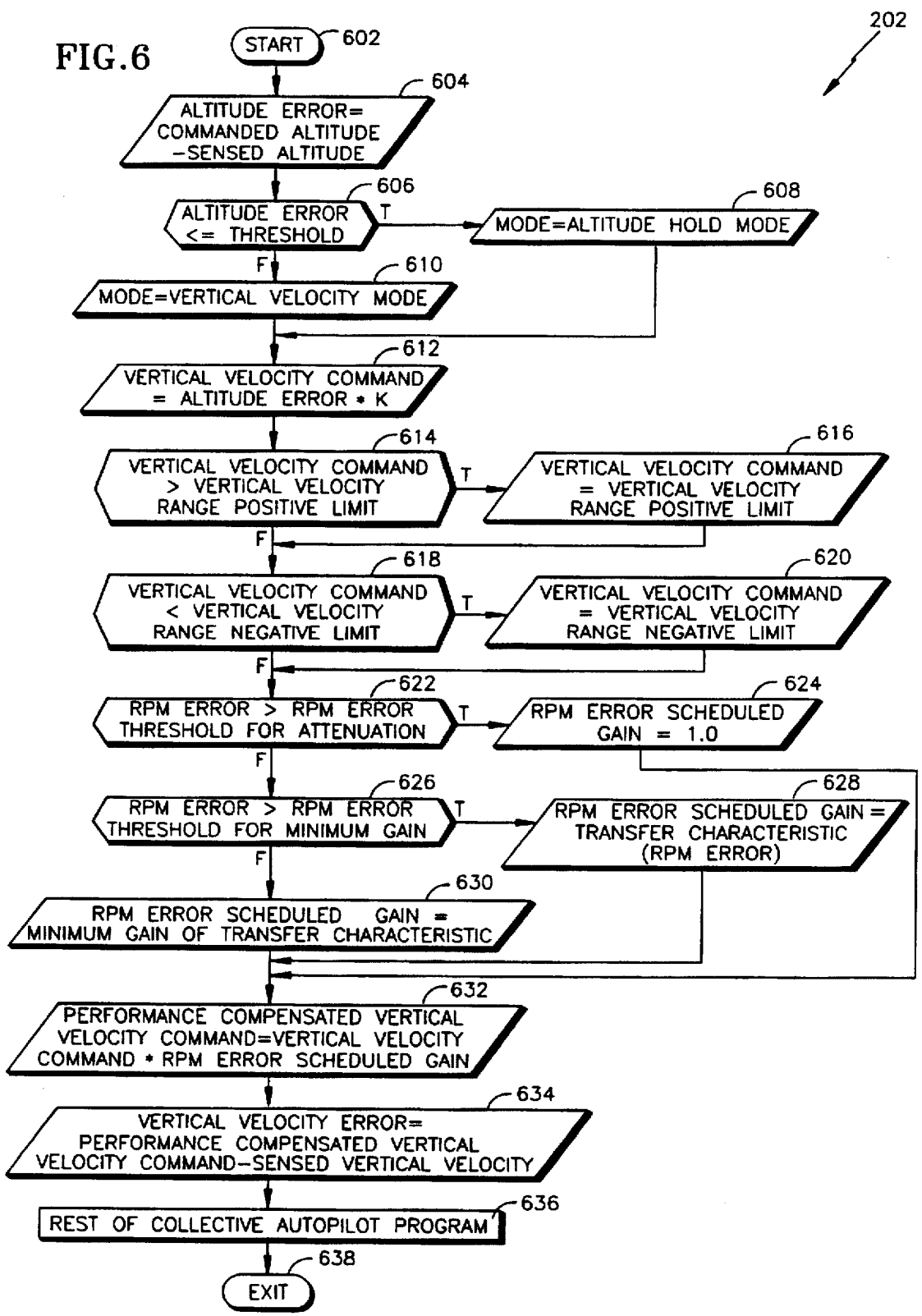
FIG. 6 is a flowchart diagram illustrating the steps performed by the vertical performance limit compensator of the present invention within the flight control of FIG. 2.

Referring now to FIG. 6, a flowchart diagram illustrates the step execution of the vertical velocity gain scheduler algorithm within the collective autopilot program. The flight control computer enters the collective autopilot program 202 at 602, and instructions 604 subtract the sensed altitude from the commanded altitude to produce the altitude error that is compared to the threshold in decision block 606. If the altitude error is less than or equal to the threshold, instructions 608 set the operating mode to altitude hold mode, otherwise, instructions 610 set the operating mode to vertical velocity mode.

A vertical velocity command that is proportional to the altitude error is produced by instructions 612. A decision block 614 determines whether the vertical velocity command is greater than the positive limit of the vertical velocity range, if so, the vertical velocity is set to the positive limit at an instruction block 616. The vertical velocity command is compared to the negative limit of the vertical velocity range at a decision block 618. If the vertical velocity command is more negative than the limit, it is set to the negative limit at an instruction block 620.

Decision block 622 determines if the RPM error is greater than, i.e. less negative and less droop, the threshold for attenuation; if so, the RPM error scheduled gain is set to 1.0 by instructions 624, otherwise, decision block 626 determines if the RPM error is greater than, i.e. less negative and less droop, the RPM error for which the transfer characteristic, described above and illustrated in FIGS. 4 and 5, is at minimum gain. If so, the RPM error scheduled gain is calculated in accordance with the transfer characteristic equation at instructions 628 or alternatively, retrieved from a memory table, which for example, corresponds to the portion of the curves 402, 502 where the gain is not constant, i.e. where gain decreases as the droop increases. Otherwise, an instruction block 630 sets the RPM error scheduled gain to the minimum gain for the transfer characteristic.

The performance compensated vertical velocity command is calculated at an instruction block 632 by multiplying the vertical velocity speed command by the RPM error scheduled gain. An instruction block 634 subtracts the sensed vertical velocity from the performance compensated vertical velocity command to produce the vertical velocity error. The rest of the collective autopilot program 202 is executed at an instruction block 636, which is well known to those skilled in the art. The collective autopilot program 202 is exited at 638.

It should be understood by those skilled in the art that although the disclosed embodiment of the vertical performance limit compensator is in programmed hardware, i.e. executed in software by a general purpose computer, it may take other forms, including hardwired hardware configurations and/or hardware manufactured in integrated circuit form, or other hardware/software configurations which may or may not include firmware.

It should be recognized that when in flight or lifting off, the UAV 10 has a commanded engine RPM of 7000 RPM and the vertical velocity command may have a magnitude greater than zero. When not in flight and not lifting off, the commanded engine RPM may be below 7000 RPM and the magnitude of the vertical velocity command signal will essentially be zero.

Although the vertical performance limit compensator in the present embodiment receives an engine RPM error signal which reflects the actual engine RPM minus the commanded engine RPM, other forms for the engine RPM error signal are also possible. The engine RPM error signal may take the form of two distinct signals which are received by the compensator, such as the commanded engine RPM signal and the actual engine RPM signal, and which in conjunction provide the compensator with the necessary indication of engine RPM droop. The compensator may then combine the two signals into a difference signal, which would then be used in the same manner as the RPM error signal in the best mode embodiment.

If the engine RPM error signal is comprised of a commanded RPM and actual RPM, the compensator may alternatively offset the transfer characteristics of the compensator by an amount equal to the commanded RPM and treat the actual RPM signal as it would the engine RPM error signal in the best mode embodiment described above. For instance, the −200 RPM threshold for attenuation (curve 412 in FIG. 4) would be offset by a commanded RPM of 7000 RPM to produce a 6800 RPM threshold for attenuation, and the actual RPM would then be compared to the 6800 RPM threshold instead of the −200 RPM threshold. In this instance, the RPM references in the transfer characteristic equation should be offset in the same manner as the threshold, so that the end result is simply the offsetting of the transfer characteristic by an amount equal to the commanded RPM and using the offset transfer characteristic in conjunction with the actual RPM signal to determine the gain.

The engine RPM error signal can also take the form of the actual RPM signal alone, if the aircraft flies with a predetermined commanded engine RPM. In this situation, the actual engine RPM in conjunction with the predetermined commanded engine RPM provides all of the indication that is required by the compensator. The compensator handles this situation in a manner that is similar to either of the manners used for the two signal engine RPM error signal above, with the exception that the predetermined commanded engine RPM is used in place of a received commanded engine RPM.

Furthermore, while the vertical performance limit compensator described comprises a vertical velocity gain scheduler which receives an RPM error signal, the vertical performance limit compensator is not limited to such an embodiment. The vertical performance limit compensator could alternatively accept any suitable engine performance limit indicating means which can be used, by itself or in conjunction with other information, for interpreting or indicating when the excess engine power has been exceeded. The indicating means should provide a signal which, when the excess engine power has been exceeded, is somewhat proportional to the degree by which it has been exceeded. The indicating means need not provide a linear signal to the vertical performance limit compensator, although a linear signal is preferred because it simplifies the compensator design. Indicating means which provide a direct measure that the excess engine power has been exceeded, i.e. the engine RPM signals described above, are preferred.

Furthermore, the vertical performance limit compensator can produce a compensated vertical velocity command without multiplying the vertical velocity command input by a gain. The compensator may use any means which produces a compensated command that is a function of the engine performance limit indicator and the command input. This may include for example, passing the command input through a limiter having limits which vary and which are based on the engine RPM error. It may also include using the engine RPM error signal and the command input to create a digital word that is used to look up a compensated command in a memory table. In each of these cases the vertical performance limit compensator provides a compensated vertical performance command which is based on the command input and engine limit indicator to reduce the power demand when the excess engine power is exceeded.

The present vertical performance limit compensator may be used in any application of an autopilot system for a rotary wing vehicle, particularly those where the power demanded by commanded vertical maneuvers can exceed the excess engine power, for example, other UAVs and rotary wing aircraft with reciprocating engines. The vehicle may be unmanned, i.e. a UAV, or it may be manned. The embodiment described above is directed to the UAV 10 which has a preferred engine speed in the range of from 6800 RPM to 7000 RPM, however, other embodiments could be developed for applications involving different aircrafts having different powerplants and/or engine speeds. In light of the disclosure of the present invention, those of ordinary skill in the art will recognize other embodiments of the vertical performance limit compensator suitable for these other applications.

In particular, alternative transfer characteristics could be developed by testing the aircraft to find a minimum engine speed which provides suitable thrust and control, in place of the −500 RPM engine error point described above, and choosing an implementation for a vertical performance limit compensator which prevents operation below that engine speed. Or, an acceptable range of engine RPM droop could be determined and transfer characteristics that prevent greater engine RPM droop could be implemented.

Further alternative transfer characteristics might be produced for another application by calculating the percentage by which the engine RPM is reduced in the set of curves 402, and developing another curve which has similar transfer characteristics, gain reductions, for similar percentage reductions in engine RPM.

While the particular invention has been described with reference to illustrative embodiments, this description is not meant to be construed in a limiting sense. It is understood that, various modifications of the illustrative embodiments, as well as additional embodiments of the invention, will be apparent to persons skilled in the art upon reference to this description without departing from the spirit of the invention, as recited in the claims appended hereto. Thus, upon understanding the present invention, one of ordinary skill in the art could employ the present invention in a variety of autopilot applications. Those skilled in the art will know of the forms which are suitable for each application. It is therefore contemplated that the appended claims will cover any such modifications or embodiments as fall within the true scope of the invention.

What is claimed is:

1. Apparatus, for modifying a vertical velocity command signal presented from a command portion of an autopilot to a closed loop portion of an autopilot in a rotary wing aircraft, the vertical velocity command signal representing a vertical velocity which the autopilot will seek to have the aircraft achieve and which results in an associated engine power demand, an engine power being required for aircraft level flight and the remaining engine power which exceeds that required for aircraft level flight being excess engine power, the apparatus comprising:

sensor means for providing an engine performance signal indicative of the presence of an engine power demand that exceeds the excess engine power, and compensation means, operatively connected between the command portion and closed loop portion of the autopilot, and responsive to the vertical velocity command signal and said engine performance signal, for providing to the closed loop portion of the autopilot, in the joint presence of both the vertical velocity command signal and said engine performance signal, a compensated vertical command signal having a magnitude that is lower than that of the vertical velocity command signal.

2. The apparatus of claim 1 wherein:

said engine performance signal comprises an engine rpm error signal representing the magnitude of an engine rpm droop; and wherein said compensation means provides said compensated vertical velocity command signal at a magnitude which is reduced from that of the vertical velocity command signal by an amount proportionate to the magnitude of said engine rpm droop.

3. The apparatus of claim 2 wherein said compensation means is comprised of:

gain factor means, responsive to said engine rpm error signal, for providing a gain factor having a maximum value of substantially unity when the magnitude of said engine rpm droop is substantially zero and which is reduced to a minimum value of no less than zero in a manner proportionate to the magnitude of said engine rpm droop; and wherein said compensation means provides said compensated vertical velocity command signal at a magnitude which is the product of said gain factor and the vertical velocity command signal.

4. The apparatus of claim 2, wherein said compensation means comprises:

memory means for storing signals, including signals representative of an algorithm which defines a transfer characteristic, said transfer characteristic identifying the locus of a plurality of gain factors, each gain factor having a magnitude dependent on the magnitude of said engine rpm droop, said plurality of gain factors ranging in magnitude from substantially unity at a minimum engine rpm droop magnitude of substantially zero to a magnitude of no less than zero at a maximum engine rpm droop magnitude; and signal processing means, connected for response to said memory means, and responsive to said engine rpm error signal for determining the actual magnitude of said engine rpm droop, said signal processing means executing said algorithm to solve for said gain factor corresponding to said actual magnitude of said engine rpm droop, said processing means being further responsive to the vertical velocity command signal, and said signal processing means providing said compensated vertical velocity command signal at a magnitude which is the product of said gain factor and the vertical velocity command signal.

5. The apparatus of claim 6 wherein said compensation means comprises:

memory means for storing signals, including signals representing a lookup table which contains a plurality of gain factors associated with a plurality of different magnitudes of said engine rpm droop, each gain factor associated with a different one of said plurality of different magnitudes of said engine rpm droop, said plurality of gain factors ranging in magnitude from substantially unity in association with a minimum engine rpm droop magnitude of substantially zero to a magnitude of no less than zero in association with a maximum engine rpm droop magnitude, each of said plurality of magnitudes of engine rpm droop having assigned to it an address location for storing said associated gain factor, and each of said gain factors is retrieved from said address location in the presence of said engine rpm droop magnitude associated with said gain factor; and signal processing means, connected for response to said memory means, and responsive to said engine rpm error signal for determining the actual magnitude of said engine rpm droop, said signal processing means retrieving the gain factor associated with the actual magnitude of said engine rpm droop, said processing means being further responsive to the vertical velocity command signal, and said signal processing means providing said compensated vertical velocity command signal at a magnitude which is the product of said gain factor associated with the actual magnitude of said engine rpm droop and the vertical velocity command signal.

6. The apparatus of claim 2 wherein said compensation means comprises:

memory means for storing signals, including signals representing a plurality of compensated vertical velocity command signals, each one of which is associated with a different one of a plurality of paired combinations of magnitudes of said engine rpm droop and the vertical velocity command signal, said plurality of compensated vertical velocity command signals having magnitudes ranging from those which are substantially equal to the vertical velocity command signal magnitude for all said paired combinations having a minimum engine rpm droop magnitudes, to magnitudes which are progressively less than the vertical velocity command signal magnitude for said paired combinations having progressively greater magnitudes of engine rpm droop, the minimum magnitude of any one of said compensated vertical velocity command signals being no less than zero, each of said plurality of paired combinations having an assigned address location for storing said associated compensated vertical velocity command signal, each of said plurality of compensated vertical velocity command signals is retrieved from said address location in the presence of the associated one of said paired combinations; and signal processing means, connected for response to said memory means, and responsive to said engine rpm error signal for determining the actual magnitude of said engine rpm droop, and responsive to said vertical velocity command signal for determining the actual magnitude of the vertical velocity command signal, said signal processing means retrieving the compensated vertical velocity command signal associated with the combination of the actual magnitude of said engine rpm droop and the actual magnitude of the vertical velocity command signal.

7. The apparatus of claim 1 wherein:

said engine performance signal comprises a pair of simultaneous signals, including an actual engine rpm signal representing the actual engine rpm and a commanded engine rpm signal representing a desired engine rpm; and wherein said compensation means provides said compensated vertical velocity command signal at a magnitude which is reduced from that of the vertical velocity command signal by an amount proportionate to the difference magnitude between said desired engine rpm and said actual engine rpm.

8. The apparatus of claim 1, wherein:

said engine performance signal comprises a pair of simultaneous signals, including an actual engine rpm signal representing the actual engine rpm and a commanded engine rpm signal representing a desired engine rpm; and wherein said compensation means subtracts the magnitude of said actual engine rpm from the magnitude of said desired engine rpm to obtain an engine rpm droop, and said compensation means provides said compensated vertical velocity command signal at a magnitude which is reduced from that of the vertical velocity command signal by an amount proportionate to the magnitude of said engine rpm droop.

9. The apparatus of claim 1, wherein said compensation means comprises:

limiter means, responsive to said engine rpm error signal, for providing a limit having a maximum value of substantially greater than the maximum magnitude of the vertical velocity command signal when the magnitude of said engine rpm droop is substantially zero and which is reduced to a minimum value of no less than zero in a manner proportionate to the magnitude of said engine rpm droop; and wherein said compensation means provides said compensated vertical velocity command signal at a magnitude which is substantially equal to the magnitude of the vertical velocity command signal when the magnitude of the vertical velocity command signal is less than that of said limit, and substantially equal to the magnitude of said limit when the magnitude of the vertical velocity command signal is not less than that of said limit.

10. Apparatus, for modifying a vertical velocity command signal presented from a command portion of an autopilot to a closed loop portion of an autopilot in a rotary wing aircraft having a substantially constant commanded engine rpm when in flight, the vertical velocity command signal representing a vertical velocity which the autopilot will seek to have the aircraft achieve and which results in an associated engine power demand, an engine power being required for aircraft level flight and the remaining engine power which exceeds that required for aircraft level flight being excess engine power, the apparatus comprising:

sensor means for providing an engine performance signal indicative of the presence of an engine power demand that exceeds the excess engine power, and compensation means, operatively connected between the command portion and closed loop portion of the autopilot, and responsive to the vertical velocity command signal and said engine performance signal, for providing to the closed loop portion of the autopilot, in the joint presence of both the vertical velocity command signal and said engine performance signal, a compensated vertical velocity command signal having a magnitude that is lower than that of the vertical command signal.

11. The apparatus of claim 10, wherein:

said engine performance signal comprises an actual engine rpm signal representing the actual engine rpm; and wherein said compensation means provides said compensated vertical velocity command signal at a magnitude which is reduced from that of the vertical velocity command signal by an amount proportionate to the difference magnitude between the substantially constant commanded engine rpm and said actual engine rpm.

12. A method for modifying a vertical velocity command signal presented from a command portion of an autopilot to a closed loop portion of an autopilot in a rotary wing aircraft, the vertical velocity command signal representing a vertical velocity which the autopilot will seek to have the aircraft achieve and which results in an associated engine power demand, an engine power being required for aircraft level flight and the remaining engine power which exceeds that required for aircraft level flight being excess engine power, the method of comprising the steps of:

providing an engine performance signal indicative of the presence of an engine power demand that exceeds the excess engine power;

receiving, from the command portion of the autopilot, the vertical velocity command signal; and providing, to the closed loop portion of the autopilot, a compensated vertical velocity command signal having a magnitude that is lower than that of the vertical velocity command signal.

13. The method of claim 12, wherein:

said engine performance signal comprises an engine rpm error signal representing the magnitude of an engine rpm droop; and wherein the step of providing a compensated vertical velocity command signal having a magnitude that is lower than that of the vertical velocity command signal comprises the step of providing a compensated vertical velocity command having a magnitude reduced from that of the vertical velocity command signal by an amount proportionate to the magnitude of said engine rpm droop.

14. The method of claim 13 wherein said step of providing a compensated vertical velocity command having a magnitude reduced from that of the vertical velocity command signal by an amount proportionate to the magnitude of said engine rpm droop comprises:

provides a gain factor having a maximum value of substantially unity when the magnitude of said engine rpm droop is substantially zero and which is reduced to a minimum value of no less than zero in a manner proportionate to the magnitude of said engine rpm droop; and providing said compensated vertical velocity command signal at a magnitude which is the product of said gain factor and the vertical velocity command signal.

15. The method of claim 13 wherein said step of providing a compensated vertical velocity command having a magnitude reduced from that of the vertical velocity command signal by an amount proportionate to the magnitude of said engine rpm droop comprises:

storing signals, including signals representative of an algorithm which defines a transfer characteristic, said transfer characteristic identifying the locus of each of a plurality of gain factors, each gain factor having a magnitude dependent on the magnitude of said engine rpm droop, said plurality of gain factors ranging in magnitude from substantially unity at a minimum engine rpm droop magnitude of substantially zero to a magnitude of no less than zero at a maximum engine rpm droop magnitude;

determining the actual magnitude of said engine rpm droop;

executing said algorithm to solve for said gain factor corresponding to said actual magnitude of said engine rpm droop; and providing said compensated vertical velocity command signal at a magnitude which is the product of said gain factor and the vertical velocity command signal.

16. The method of claim 13 wherein said step of providing a compensated vertical velocity command having a magnitude reduced from that of the vertical velocity command signal by an amount proportionate to the magnitude of said engine rpm droop comprises:

storing signals, including signals representing a lookup table which contains a plurality of gain factors associated with a plurality of different magnitudes of said engine rpm droop, each gain factor associated with a different one of said plurality of different magnitudes of said engine rpm droop, said plurality of gain factors ranging in magnitude from substantially unity in association with a minimum engine rpm droop magnitude of substantially zero to a magnitude of no less than zero in association with a maximum engine rpm droop magnitude, each of said plurality of magnitudes of engine rpm droop having assigned to it an address location for storing said associated gain factor, and each of said gain factors is retrieved from said address location in the presence of said engine rpm droop magnitude associated with said gain factor;

determining the actual magnitude of said engine rpm droop retrieving the gain factor associated with the actual magnitude of said engine rpm droop; and providing said compensated vertical velocity command signal at a magnitude which is the product of said gain factor associated with the actual magnitude of said engine rpm droop and the vertical velocity command signal.

17. The method of claim 13 wherein said step of providing a compensated vertical velocity command having a magnitude reduced from that of the vertical velocity command signal by an amount proportionate to the magnitude of said engine rpm droop comprises:

storing signals, including signals representing a lookup table which contains a plurality of compensated vertical velocity command signals, each one of which is associated with a different one of a plurality of paired combinations of magnitudes of said engine rpm droop and the vertical velocity command signal, said plurality of compensated vertical velocity command signals having magnitudes ranging from those which are substantially equal to the vertical velocity command signal magnitude for all said paired combinations having a minimum engine rpm droop magnitudes, to magnitudes which are progressively less than the vertical velocity command signal magnitude for said paired combinations having progressively greater magnitudes of engine rpm droop, the minimum magnitude of any one of said compensated vertical velocity command signals being no less than zero, each of said plurality of paired combinations having an assigned address location for storing said associated compensated vertical velocity command signal, each of said plurality of compensated vertical velocity command signals is retrieved from said address location in the presence of the associated one of said paired combinations;

determining the actual magnitude of said engine rpm droop;

determining the actual magnitude of the vertical velocity command signal;

retrieving the compensated vertical velocity command signal associated with the combination of the actual magnitude of said engine rpm droop and the actual magnitude of the vertical velocity command signal.

18. The method of claim 13 wherein said step of providing a compensated vertical velocity command having a magnitude reduced from that of the vertical velocity command signal by an amount proportionate to the magnitude of said engine rpm droop comprises:

providing a limit having a maximum value of substantially greater than the maximum magnitude of the vertical velocity command signal when the magnitude of said engine rpm droop is substantially zero and which is reduced to a minimum value of no less than zero in a manner proportionate to the magnitude of said engine rpm droop; and providing said compensated vertical velocity command signal at a magnitude which, is substantially equal to the magnitude of the vertical velocity command signal when the magnitude of the vertical velocity command signal is less than that of said limit, and substantially equal to the magnitude of said limit when the magnitude of the vertical velocity command signal is not less than that of said limit.

19. The method of claim 12 wherein:

said engine performance signal comprises a pair of simultaneous signals, including an actual engine rpm signal representing the actual engine rpm and a commanded engine rpm signal representing a desired engine rpm; and wherein the step of providing a compensated vertical velocity command signal having a magnitude that is lower than that of the vertical velocity command signal comprises the step of providing a compensated vertical velocity command having a magnitude reduced from that of the vertical velocity command signal by an amount proportionate to the difference magnitude between said desired engine rpm and said actual engine rpm.

20. The method of claim 12 wherein:

said engine performance signal comprises a pair of simultaneous signals, including an actual engine rpm signal representing the actual engine rpm and a commanded engine rpm signal representing a desired engine rpm;

and further comprising the step of subtracting the magnitude of said actual engine rpm from the magnitude of said desired engine rpm to obtain an engine rpm droop; and wherein the step of providing a compensated vertical velocity command signal having a magnitude that is lower than that of the vertical velocity command signal comprises the step of providing a compensated vertical velocity command having a magnitude reduced from that of the vertical velocity command signal by an amount proportionate to the magnitude of said engine rpm droop.

21. A method for modifying a vertical velocity command signal presented from a command portion of an autopilot to a closed loop portion of an autopilot in a rotary wing aircraft having a substantially constant commanded engine rpm when in flight, the vertical velocity command signal representing a vertical velocity which the autopilot will seek to have the aircraft achieve and which results in an associated engine power demand, an engine power being required for aircraft level flight and the remaining engine power which exceeds that required for aircraft level flight being excess engine power, the method comprising the steps of:

providing an engine performance signal indicative of the presence of an engine power demand that exceeds the excess engine power;

receiving, from the command portion of the autopilot, the vertical velocity command signal; and providing, to the closed loop portion of the autopilot, a compensated vertical velocity command signal having a magnitude that is lower than that of the vertical velocity command signal.

22. The method of claim 21 wherein:

the step of providing an engine performance signal comprises providing an actual engine rpm signal representing the actual engine rpm; and wherein the step of providing a compensated vertical velocity command signal having a magnitude that is lower than that of the vertical velocity command signal comprises providing a compensated vertical velocity command having a magnitude reduced from that of the vertical velocity command signal by an amount proportionate to the difference magnitude between the substantially constant commanded engine rpm and said actual engine rpm.

* * * * *